United States Patent [19]

Hirami et al.

[11] Patent Number: 4,931,969
[45] Date of Patent: Jun. 5, 1990

[54] CHARACTER ENTRY DEVICE

[75] Inventors: Akira Hirami; Yasuhiro Taguchi, both of Nara, Japan

[73] Assignee: Sharp Kabushiki Kaisha, Osaka, Japan

[21] Appl. No.: 423,558

[22] Filed: Oct. 16, 1989

Related U.S. Application Data

[63] Continuation of Ser. No. 122,183, Nov. 18, 1987, abandoned.

[30] Foreign Application Priority Data

Nov. 18, 1986 [JP] Japan .................................. 61-274855

[51] Int. Cl.⁵ .............................................. G06F 3/147
[52] U.S. Cl. ............................ 364/709.15; 364/709.14
[58] Field of Search ...................... 364/709.14, 709.15, 364/709.16

[56] References Cited

U.S. PATENT DOCUMENTS

| | | | |
|---|---|---|---|
| 4,385,291 | 5/1983 | Piguet | 364/709.15 |
| 4,481,508 | 11/1984 | Kamei et al. | 340/712 |
| 4,636,971 | 1/1987 | Ootsuka | 364/709.16 |
| 4,647,911 | 3/1987 | Maegawa et al. | 364/709.14 |
| 4,718,029 | 1/1988 | Morino et al. | 364/709.16 |

Primary Examiner—David H. Malzahn
Attorney, Agent, or Firm—Birch, Stewart, Kolasch & Birch

[57] ABSTRACT

A character entry device comprises a keyboard having at least one specific key, a memory, and controls. When codes corresponding to particular characters are input through the keyboard, the memory is operable to store each of the particular characters in sequence in correspondence with the specific key. The controls are operable to be controlled such that, when the specific key is operated, the corresponding particular character is entered in accordance with the content of the memory. Thus, the device is capable of ensuring that a particular character which is not provided with a corresponding character key on the keyboard can be entered with a remarkably improved level of efficiency.

11 Claims, 7 Drawing Sheets

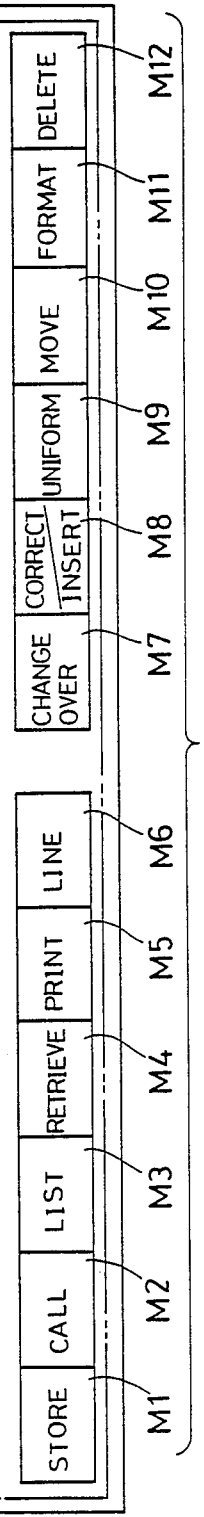

FIG. 5

| | 澤 | 吸 | | [株] | [有] | α | β | | | ♪ | ¶ |
|---|---|---|---|---|---|---|---|---|---|---|---|
| | 1013 | 1036 | | 1279 | 1280 | 3040 | 3041 | | | 8596 | 8599 |

FIG. 4

| 澤 | 吸 | α | β | ¶ | [株] | [有] | ♪ | | | | |
|---|---|---|---|---|---|---|---|---|---|---|---|
| A1 | A2 | A3 | A4 | A5 | A6 | A7 | A8 | A9 | A10 | A11 | A12 |

4,931,969

CHARACTER ENTRY DEVICE

This application is a continuation of application Ser. No. 07/122,183 filed on November 18, 1987, now abandoned.

BACKGROUND OF THE INVENTION

1. Field of the Invention

The present invention relates to a character entry device which is suitable for use in apparatuses such as word processors and personal computers.

2. Description of the Prior Art

When it is necessary to enter characters such as Japanese syllabic characters (kana characters) into an apparatus such as a word processer, the characters are entered by operating, usually depressing, those character keys provided on the keyboard which correspond to the desired characters. When it is desired to enter kanji characters (Chinese characters), they are usually entered by executing kana/kanji conversions in which kana characters input through corresponding character keys are converted into the corresponding kanji characters. On the other hand, when it is necessary to enter certain characters such as some kanji characters which cannot be entered by executing kana/kanji conversions and symbols which cannot be input through the keyboard, they are entered by various input methods. Such methods are executed by, for instance, an input of a predetermined four-digit code, a symbol input, an input using the correspondence between multiple readings of a kanji character, a non-standard character (user-synthesized character) input, an alphabetical character input, or an input using the classification of various radical elements of kanji characters. For instance, in an input method in which a predetermined code is input, a four-digit code number (graphic character code number) is inputted by operation of ten keys.

With this arrangement, however, when it is necessary to re-enter a character which has previously been entered by a predetermined character code input method, the four-digit code number corresponding to that character has to be input again. This makes the input operation complicated. The problem is particularly serious when the character is frequently used and when the user has to input the four-digit code number each time it is used.

SUMMARY OF THE INVENTION

An object of the present invention is to provide a character entry device, for use in an apparatus such as a word processor or a personal computer, which is capable of facilitating the entry of particular characters that are not provided with corresponding character keys on the keyboard, and which is thus capable of providing an improved level of efficiency.

According to the present invention, there is provided a character entry device comprising: input key means having at least one specific key; memory means which is, when codes corresponding to particular characters are input through the input key means, operable to store each of the particular characters in sequence in correspondence with the specific key; and control means which is operable to control that, when the specific key is operated, the corresponding particular character is entered in accordance with the content of the memory means.

With the character entry device constructed in accordance with the present invention as stated above, whenever a predetermined code is input by operating the input key means, a particular character corresponding to the input code is stored in an area among at least one memory area of the memory means which is provided in correspondence with at least one specific key for the storage of particular characters, in a sequential manner. Thereafter, when the specific key is operated, a particular character which corresponds to the specific key from among particular characters stored in the corresponding areas of the memory means is entered.

Thus, the character entry device in accordance with the present invention is capable of ensuring that specific characters which are not provided with corresponding character keys on the input key means can be entered with high efficiency.

BRIEF DESCRIPTION OF THE DRAWINGS

FIG. 3 is a view showing an example of a display on a display screen 13 of a display unit 12 shown in FIG. 1;

FIG. 4 is a view schematically showing memory areas of a special character information memory 11 shown in FIG. 1;

FIG. 5 is a view schematically showing memory areas of a special character retrieval table 10 shown in FIG. 1;

DESCRIPTION OF THE PREFERRED EMBODIMENTS

The present invention will now be described in detail with respect to preferred embodiments thereof with reference to the drawings.

Figure 1:
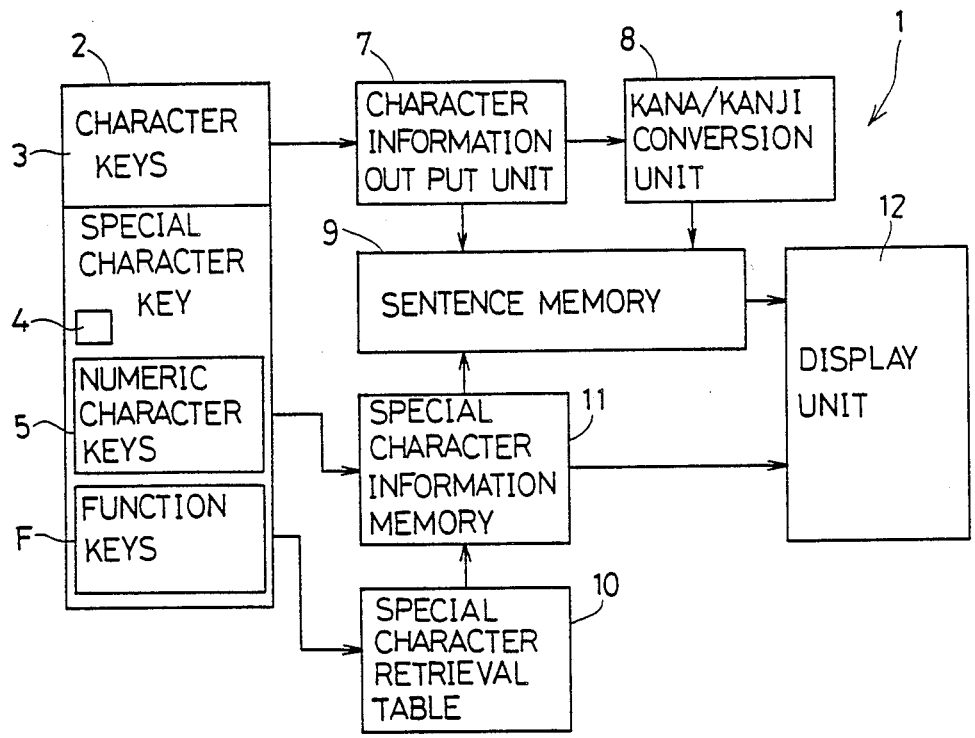
FIG. 1 is a block diagram showing the electrical construction of one embodiment of the present invention.

FIG. 1 is a block diagram showing the electrical construction of a character entry device in accordance with one embodiment of the present invention. A word processor 1, to which the character entry device of the present invention is applied by way of example, includes a keyboard 2 (which acts as the input key means) having a group of character keys 3, a special character key 4, a group of numeric character keys 5, and function keys F (which act as the at least one specific key stated above). The function keys F will be described in detail later. A character information output unit 7 stores a table of coded characters which correspond to the respective character keys 3. The and the unit 7 is connected to the keyboard 2. The character information output unit 7 is also connected to a sentence memory 9 via a kana/kanji conversion unit 8 while being directly connected to the sentence memory 9.

A special character retrieval table 10 stores special characters which cannot be entered by means of the character keys 3 and is connected to the keyboard 2. The special character retrieval table 10 is also connected to the sentence memory 9 via a special character information memory 11 (which acts as the memory means), described later. The special character information memory 11 is also connected to the sentence memory 9. The sentence memory 9 and the special character information memory 11 are respectively connected to a display unit 12 provided for displaying information stored in these memories 9 and 11.

Figure 2:
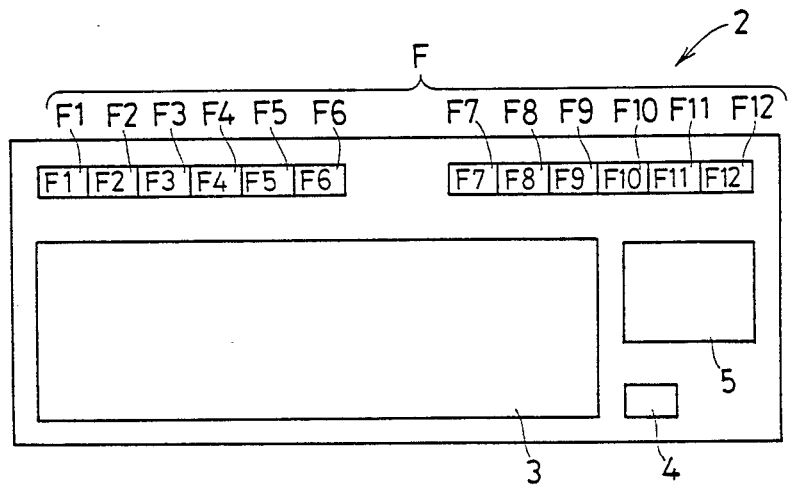
FIG. 2 is a view showing the key arrangement of a keyboard 2 shown in FIG. 1.

FIG. 2 shows the key arrangement of the keyboard 2, and FIG. 3 is a view illustrating a display on a display screen 13 of the display unit 12. Referring first to FIG. 2, the keyboard 2 comprises a group of character keys 3 through which kana characters, katakana (the angular form of kana) characters and kanji characters obtained by converting kana or katakana characters can be entered. It further comprises a group of numeric character keys 5 through which numeric characters "0" to "9" can be entered; the special character key 4 through which the special character entrance mode can be selected when it is necessary to enter a special character that cannot be entered by means of the character keys 3; and a group of function keys F. The function keys F comprise, for instance, twelve function keys F1 to F12 (which may hereinafter be in general referred to as "function keys F") which can be used to execute various functions such as the "store" function, the "call" function, and the "list" function.

Referring to FIG. 3, a lower portion of the display screen 13 defines a guidance field 14 which provides guidance for the user to facilitate his task. In this guidance field 14, various types of information can be displayed, such as the operating condition at the time of an input operation through a key, or information on a format setting. The field 14 includes a group of function menu display regions M which comprise, for instance, twelve function menu display regions M1 to M12 (which may hereinafter be in general referred to as "function menu display regions M"). In these function menu display regions M, the various functions corresponding to the twelve function keys F can be displayed. The remainder of the display screen 13 defines a sentence display field 16 for displaying ordinary characters, etc.

FIG. 4 schematically illustrates memory areas of the special character information memory 11. The special character information memory 11 is provided with, for instance, twelve character storing areas A1 to A12. Into these areas A1 to A12, character fonts stored in the special character retrieval table 10 may be stored in sequence starting from the area A1 toward the area A12 in response to a key signal from the keyboard 2 in a manner to be described later.

FIG. 5 schematically illustrates memory areas of the special character retrieval table 10. The table 10 has a code storing area 17 and a character storing area 18. It is constructed such that special characters corresponding to code numbers stored in the code storing area 17 are stored in the corresponding parts of the character storing area 18. For instance, the character " " is stored under the code number "1013".

Figure 6:
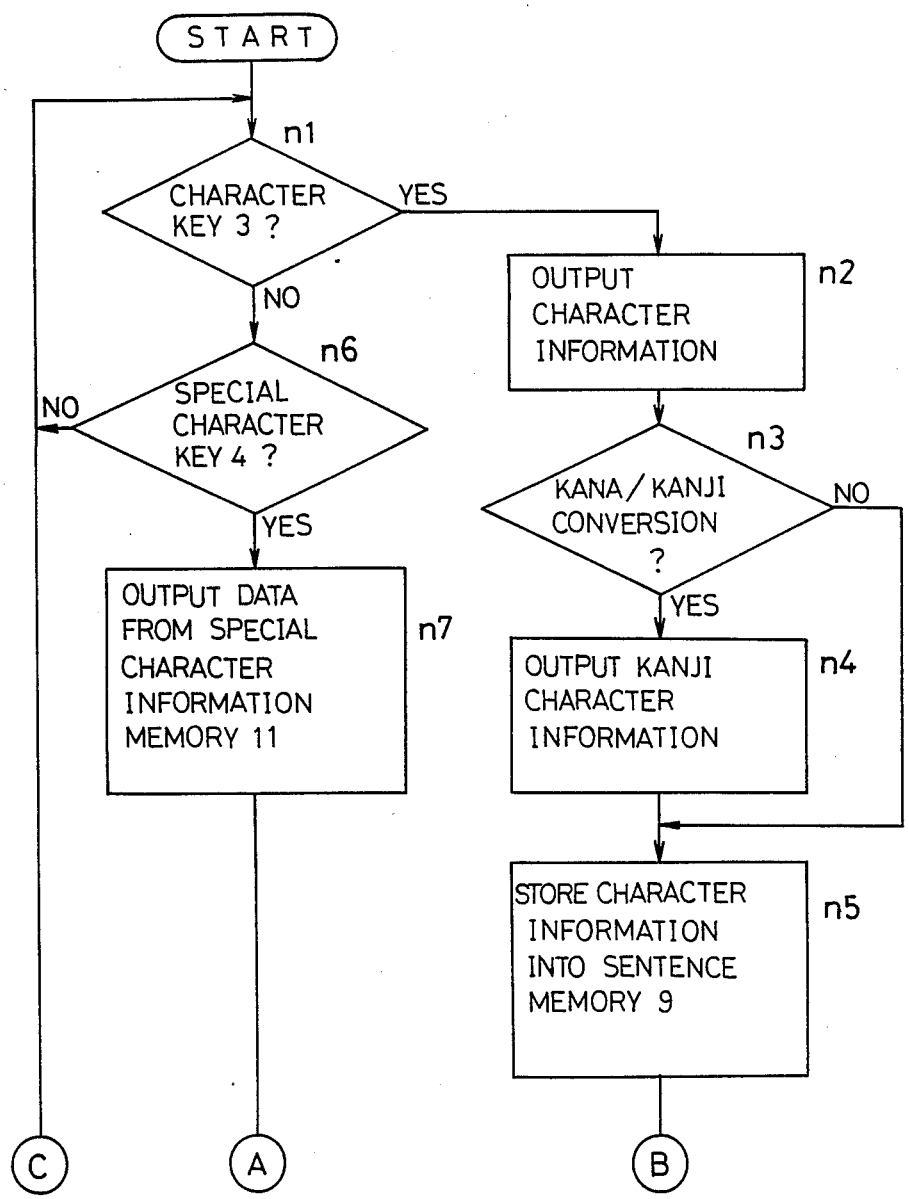
FIGS. 6(a) and 6(b) comprise a flowchart showing the processes of an entering operation.
Figure 6:
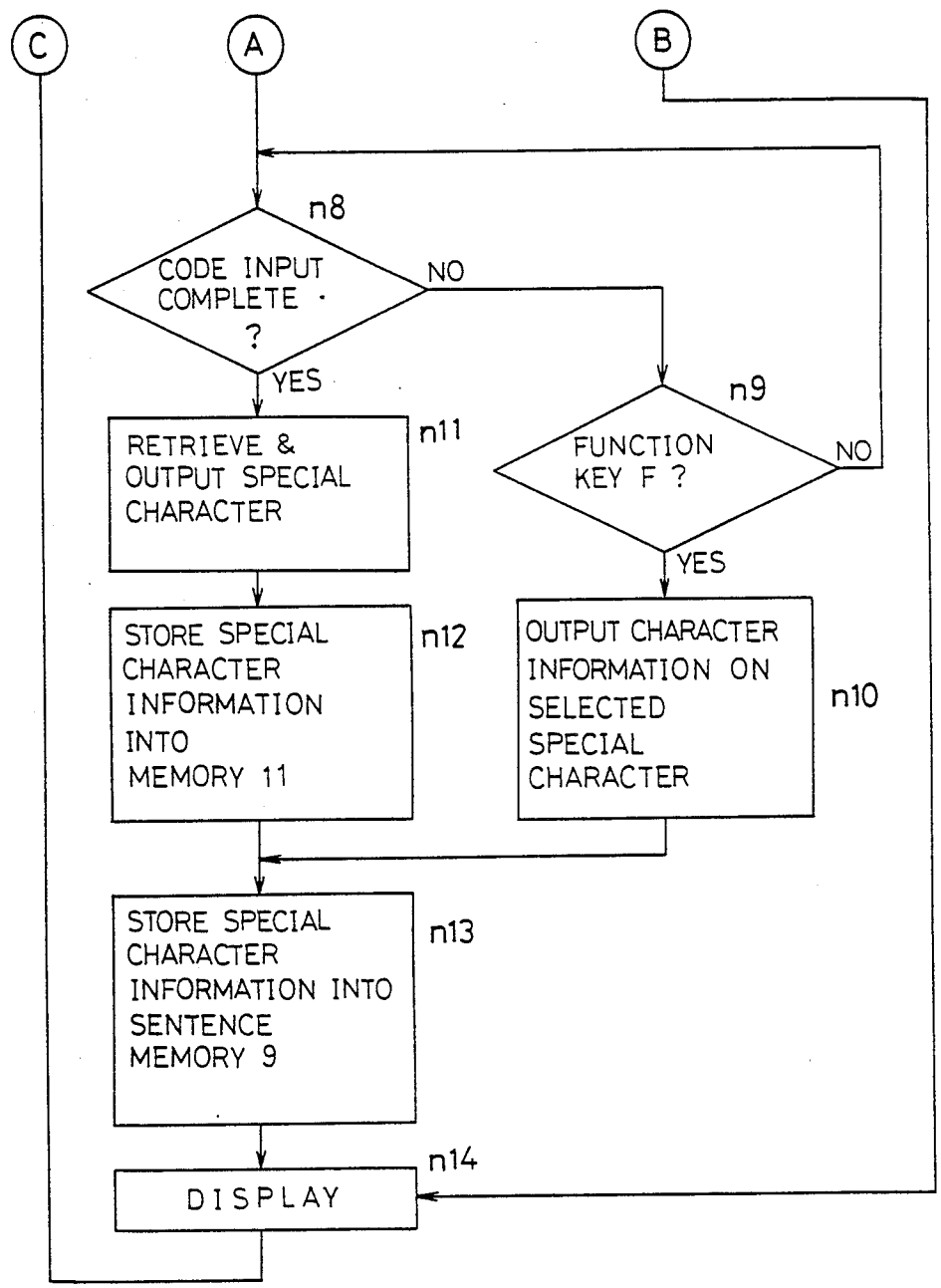

FIG. 6 is a flowchart showing the processes of input operation through various keys which are executed by the device in accordance with the embodiment.

In step n1, it is determined whether or not a key on the keyboard 2 that is depressed is any one of the character keys 3. If the answer is yes, the step n2 is executed.

In step n2, a key signal corresponding to the depressed character key 3 is supplied to the character information output unit 7, and a character from among characters stored in a first area of the unit 7 that corresponds to this key signal is temporarily stored in a second storing area (not shown) of the unit 7 which is provided therein separately from the first area.

In step n3, it is determined whether or not the character, for instance, a kana character, that is stored in the second storing area of the character information output unit 7, is to be converted into a kanji character. If the answer is yes, the step n4 is executed.

In step n4, a code corresponding to the character, for instance, the kana character, stored in the second storing area of the character information output unit 7, is supplied to the kana/kanji conversion unit 8, so that a kanji character corresponding to the kana character is output from the conversion unit 8.

The program then proceeds to step n5 wherein a character font corresponding to the kanji character output from the kana/kanji conversion unit 8 is supplied to the sentence memory 9 and is stored temporarily therein.

On the other hand, if it is judged in step n3 that the kana character will not be converted into a kanji character, the program proceeds directly to step n5. A character font corresponding to the kana character stored in the second storing area of the character information output unit 7 is supplied to the sentence memory 9 and is temporarily stored therein. Thereafter, the program skips to step 14, as will be described later.

When it is judged in step n1 that the depressed key is a key which is not one of the character keys 3, the step n6 is executed.

In step n6, it is determined whether or not the depressed key is the special character key 4. If the answer is yes, step n7 is executed. On the other hand, if it is judged in step n6 that the depressed key is a key which is not the special character key 4, the program returns to step n1. At this time, according to the flowchart shown in FIG. 6, the program executes the routine from the step n6 to the step n1 even if the depressed key is, for instance, one of the function keys F. However, in practice, the function that corresponds to the depressed function key F is executed if such is the case.

In step n7, a control signal is supplied from the keyboard 2 to the special character information memory 11 by the depression of the special character key 4. This causes the character fonts stored in the special character information memory 11 to be supplied to the display unit 12. It is assumed that each of the storing areas A1 to A12 of the memory 11 stores each of, for instance, the characters shown in FIG. 4. The display unit 12 operates to display on the display screen 13 a display such as that, for instance, shown in FIG. 7.

Figure 7:
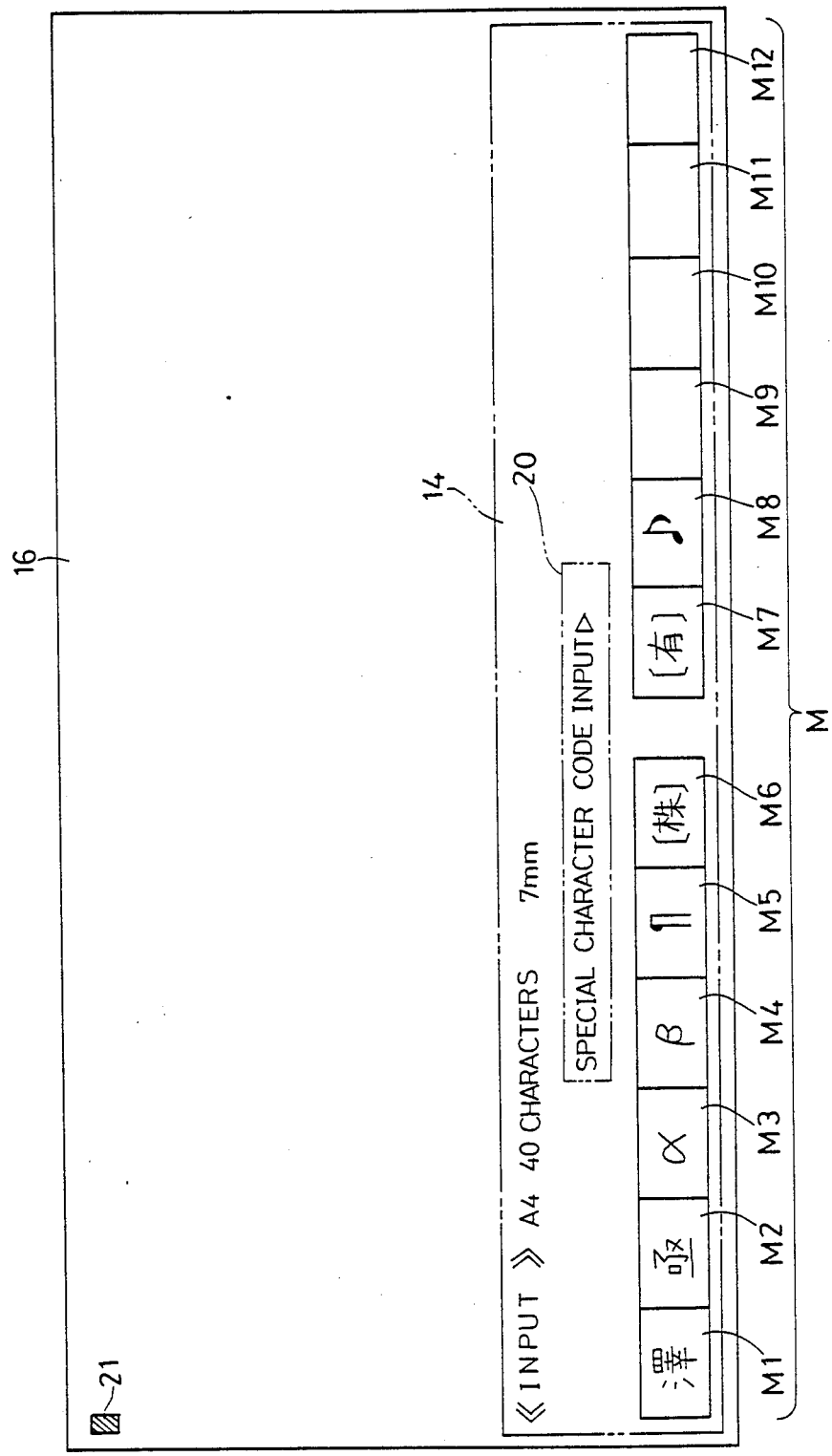
FIG. 7 is a view showing another example of a display on the display screen 13.

As shown in FIG. 7, each of the function menu display regions M1 to M12 of the display screen 13 displays each of the characters stored in the special character information memory 11 instead of displaying each of the various functions, such as the "store", "call", and "list" functions illustrated in FIG. 3. Simultaneously, a character code display region 20 is provided in the guidance field 14 so as to enable the display of a code number which can be input by inputting a predetermined four-digit number if the operator does so following the display.

The program then proceeds to step n8. In step n8, it is determined whether or not the input of a four-digit code number corresponding to a desired special character has been completed. If the answer is no, the step n9 is executed.

In step n9, it is determined whether or not any function key F corresponding to the desired special character has been depressed. If it is judged that a function key F has been depressed, step n10 is executed, while if not, the program returns to step n8.

Figure 8:
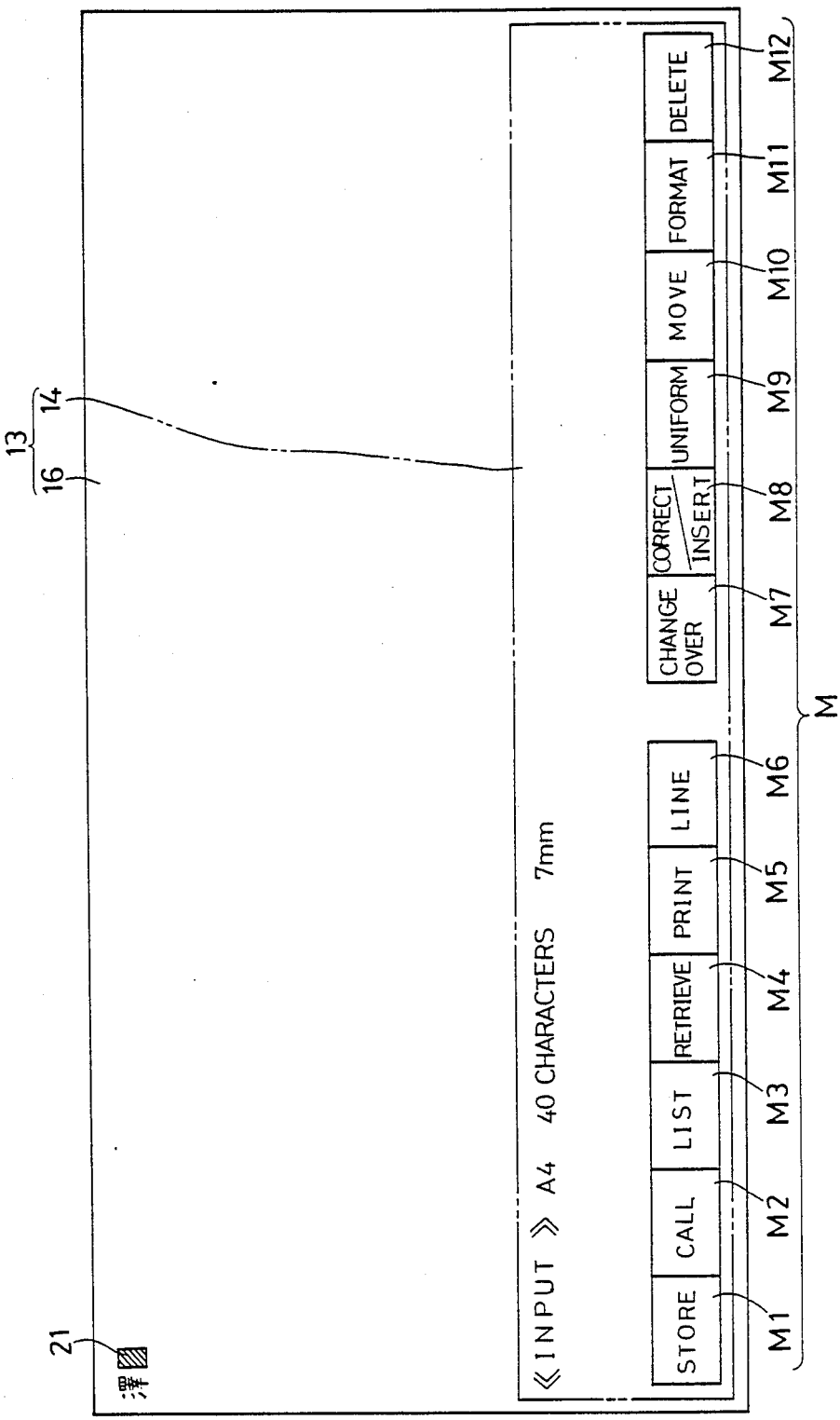
FIG. 8 is a view showing a further example of a display on the display screen 13.

In step n10, a character font of the desired special character corresponding to the depressed function key F is output from the corresponding storing area A of the special character information memory 11. In step 13, the outputted special character is then stored temporarily in the sentence memory 9. Then, in step n14, the thus temporarily stored special character is then displayed on the display screen 13 of the display unit 12 at a location of the cursor 21. For instance, if the function key F1 is depressed while the display screen 13 displays the display illustrated in FIG. 7, the character " " is displayed at the location of the cursor 21, as shown in FIG. 8.

On the other hand, if it is judged in step n8 that the input of the four-digit code number has been completed, step n11 is executed.

In step n11, the code number input by the operation of depressing numerical character keys 5 is supplied from the keyboard 2 to the special character retrieval table 10. In the table 10, a special character corresponding to the thus supplied code is retrieved and output.

In step n12, the special character which has been retrieved from the special character retrieval table 10 in step n11 is supplied to the special character information memory 11. In this way, special characters retrieved and output from the table 10 are supplied to the memory 11 and are stored in the character storing areas A in sequence, always starting from the area A1. In other words, each time an item of information on a special character is output from the special character retrieval table 10 and is supplied to the special character information memory 11, characters sequentially stored in the memory 11 each shift by one area from the area A1 toward the area A12. Thus, the special character information memory 11 stores twelve special characters at most. In step n13, as previously described, a character font of the desired character is supplied from the memory 11 to the sentence memory 9 to be temporarily stored therein.

In step n14, also as previously described, the character stored in the sentence memory 9 is supplied to the display unit 12.

As described above, with the character entry device in accordance with the present invention, when it is necessary to re-enter a character such as a kanji character, which cannot be entered by using kana/kanji conversion or a symbol which cannot be entered through the keyboard, which has previously been entered by executing, (for instance, an input of a four-digit character code number), it is possible to enter such a character by depressing the special character key 4. Then the special characters which have previously been entered by executing four-digit character code number inputs are displayed in the guidance field 14. This is achieved by depressing a function key F corresponding to the desired character. Thus, the device in accordance with the invention is capable of remarkably improving the efficiency with which particular characters can be entered by, for instance, inputting four-digit code numbers.

Although in the foregoing embodiment each of the storing areas A of the special character information memory 11, which corresponds to each of the function keys F1 to F12, is adapted to store only one character, the memory 11 may alternatively be adapted to allow each of the areas thereof corresponding to each of the function keys F1 to F12 to be capable of storing a plurality of characters. In this case, the arrangement of the device may alternatively be such that whenever a function key F is depressed, the plurality of characters are displayed in a cyclic manner.

Further, although in the foregoing embodiment descriptions are given concerning only the entry of a special character by executing the input of a four-digit code number, this is not limitative, and another input method may be used. For instance, a symbol input, an input using the correspondence between multiple readings of a kanji character, a non-standard character (user-synthesized character) input, an alphabetical character input, or an input using the classification of various radical elements of kanji characters may alternatively be employed in a similar manner to that of the foregoing embodiment.

As described above, the character entry device in accordance with the present invention is capable of storing particular characters in the memory means in sequence by inputting character codes through the input key means, retrieving a desired character from the memory means from among the characters stored therein by operating a specific key, and thereby entering the desired character. Therefore, it is ensured that a particular character which is entered by inputting a character code number can be entered with a remarkably improved level of efficiency.

The character entry device in accordance with the present invention may advantageously be used in an apparatus such as a word processer or a personal computer.

What is claimed is:

1. A method of entering characters not represented on keys of a character entry device by utilizing the character entry device containing numeric, special, and specific keys as input means, comprising the steps of:
   storing a plurality of characters and code numbers corresponding to said plurality of characters, in a first memory means;
   entering a special input mode by depression of a special key of said input means;
   displaying a menu of characters available to be selected in response to the depression of said special key input means;
   selecting a desired character by depression of a specific key input means which corresponds to said displayed desired character, if said desired character was previously displayed;
   entering a code number corresponding to a desired character, as stored in said first memory means, if said desired character was not previously displayed;
   storing said entered code number and said corresponding desired character in a second memory means, said second memory means thereby associating said desired character with a specific key input means; and
   displaying said stored desired character.

2. A method as claimed in claim 1, further comprising the steps of:
   re-entering said desired character by depression of said associated specific key input means; and
   displaying said desired character in response to the depression of said specific key input means.

3. A method as claim in claim 2, further comprising the steps of:

entering a plurality of code numbers, each corresponding to one of a plurality of characters stored in said first memory means; and storing said entered plurality of code numbers and said corresponding plurality of characters in a second memory means, said second memory means thereby associating each of said plurality of characters with a specific key input means.

4. A method, as claimed in claim 3, further comprising the steps of:

re-entering said plurality of characters by depression of said specific key input means; and sequentially displaying a different one of said plurality of characters in response to sequential depressions of said specific key input means.

5. A method as claimed in claim 1, further comprising the steps of;

entering a plurality of code numbers, each corresponding to one of a plurality of characters, as stored in said first memory means;

storing each of said plurality of entered code numbers with each corresponding character in said second memory means, said second memory means thereby associating each of said plurality of characters with one of a plurality of specific key input means;

re-entering a desired one of said plurality of characters by depression of one of said plurality of specific key input means; and displaying said desired character in response to the depression of said one of said plurality of specific key input means.

6. A method, as claim in claim 5, wherein:

said plurality of specific key input means comprises a finite number;

said entering and storing of each of said plurality of characters in said second memory means associates each of a finite number of characters, equal in number to the number of finite plurality of specific key input means, with a different one of a plurality of specific key input means; and upon entering of new characters greater in number than said finite number of said plurality of specific key input means, sequentially replacing said previously stored characters stored in said second memory means with said newly entered characters and thereby associating said plurality of specific key input means with said newly entered characters in a sequential manner;

sequentially displaying a different one of said plurality of characters in response to sequential depressions of said specific key input means.

7. A character entry apparatus which utilizes numeric, special, and specific keys as input means to input characters not contained on the apparatus, the apparatus comprising:

a first memory means for storing a plurality of characters and code numbers corresponding to said plurality of characters;

special key input means for entering a special input mode by depression of a special key input means;

display means for displaying a menu of characters available to be selected in response to the depression of said special key input means;

specific key input means for selecting a desired character by depression of said specific key input means which corresponds to said displaying desired character, if said desired character was previously displayed;

numeric key input means for entering a code number corresponding to a desired character, as stored in said first memory means, if said desired character was not previously displayed;

second memory means for storing said entered code number and said corresponding desired character in said second memory means, said second memory means thereby associating said desired character with a specific key input means; and said display means displaying said stored desired character.

8. An apparatus as claimed in claim 7, further comprising:

said specific key input means for re-entering said desired character by depression of said associated specific key input means; and said display means displaying said desired character in response to the depression of said specific key input means.

9. An apparatus, as claimed in claim 8, further comprising:

said numeric key input means for entering a plurality of code numbers, each corresponding to one of a plurality of characters stored in said first memory means; and said second memory means storing said entered plurality of code numbers and said corresponding plurality of characters in said second memory means, said second memory means thereby associating each of said plurality of characters with a specific key input means.

10. An apparatus, as claimed in claim 9, further comprising:

said specific key input means for re-entering said plurality of characters by depression of said specific key input means; and said display means sequentially displaying a different one of said plurality of characters in response to sequential depressions of said specific key input means.

11. An apparatus as claimed in claim 7, further comprising:

said numeric key input means for entering a plurality of code numbers, each corresponding to one of a plurality of characters, as stored in said first memory means;

said second memory means storing each of said plurality of entered code numbers with each corresponding character in said second memory means, said second memory means thereby associating each of said plurality of characters with one of a plurality of specific key input means;

said specific key input means for re-entering a desired one of said plurality of characters by depression of one of said plurality of specific key input means; and said display means displaying said desired character in response to the depression of said one of said plurality of specific key input means.

* * * * *